(12) United States Patent
Kent (10) Patent No.: US 9,297,349 B1
(45) Date of Patent: Mar. 29, 2016

(54) HYDROELECTRIC TURBINE SYSTEM AND METHOD OF MANUFACTURE

(71) Applicant: The Boeing Company, Seal Beach, CA (US)

(72) Inventor: Steven R. Kent, Downey, CA (US)

(73) Assignee: The Boeing Company, Chicago, IL (US)

( * ) Notice: Subject to any disclaimer, the term of this patent is extended or adjusted under 35 U.S.C. 154(b) by 773 days.

(21) Appl. No.: 13/665,683

(22) Filed: Oct. 31, 2012

(51) Int. Cl.
*F03B 3/00* (2006.01)
*B21D 53/78* (2006.01)
*H02K 15/00* (2006.01)

(52) U.S. Cl.
CPC . *F03B 3/00* (2013.01); *B21D 53/78* (2013.01); *H02K 15/00* (2013.01)

(58) Field of Classification Search
CPC ............ F03B 7/00; F03B 7/003; F03B 7/006; F03B 9/00; F03B 9/005; F03B 17/06; F03B 17/062–17/068
USPC ........................ 290/53, 54; 415/3.1, 101, 103
See application file for complete search history.

(56) References Cited

U.S. PATENT DOCUMENTS

| | | | | |
|---|---|---|---|---|
| 1,745,356 A | * | 2/1930 | Crofton | ............. F03B 17/063 416/123 |
| 4,219,304 A | * | 8/1980 | Schock | ............. F03B 17/061 114/121 |
| 6,246,125 B1 | | 6/2001 | Axtell | |
| 6,551,053 B1 | | 4/2003 | Schuetz | |
| 6,759,757 B1 | | 7/2004 | Campbell | |
| 7,081,690 B2 | | 7/2006 | Coman | |
| 7,223,137 B1 | | 5/2007 | Sosnowski | |
| 7,462,949 B2 | | 12/2008 | Coman | |
| 7,670,101 B2 | | 3/2010 | Mui | |
| 7,862,292 B2 | | 1/2011 | Patterson | |
| 7,969,034 B2 | | 6/2011 | Winius | |
| 8,058,741 B1 | | 11/2011 | Echemendia | |
| 8,076,791 B2 | * | 12/2011 | Hostetler | .............. F03B 17/067 290/54 |
| 8,120,196 B1 | | 2/2012 | Neese | |

FOREIGN PATENT DOCUMENTS

| | | | | |
|---|---|---|---|---|
| GB | 191009381 A | * | 0/1911 | ............... B63H 1/08 |
| GB | 2459843 A | * | 11/2009 | ............ F03B 13/264 |
| JP | 55164781 A | * | 12/1980 | |

* cited by examiner

*Primary Examiner* — Igor Kershteyn
*Assistant Examiner* — Woody A Lee, Jr.
(74) *Attorney, Agent, or Firm* — Armstrong Teasdale LLP (57) ABSTRACT

In one implementation, a hydropower module for use in a flowing body of water is described. The module includes an axle and a plurality of paddle fans rotatably coupled to the axle and having a paddle fan rotation. Each paddle fan of the plurality of paddle fans includes a plurality of blades configured to be driven by the body of water. The plurality of paddle fans are oriented in an arc wherein the blades of adjacent paddle fans are closer together at a top of the paddle fan rotation than at a bottom of the paddle fan rotation.

20 Claims, 6 Drawing Sheets

HYDROELECTRIC TURBINE SYSTEM AND METHOD OF MANUFACTURE

BACKGROUND OF THE DISCLOSURE

The field of the disclosure relates generally to hydroelectric power generation and, more specifically, to paddle wheel hydroelectric turbine systems.

Harnessing the potential or kinetic energy of water to provide motive force or electrical power is well known. Large hydropower projects, such as dams, take advantage of the potential energy available from water falling from one elevation to a lower elevation. However, suitable sites for conventional hydropower installations are becoming scarce, and the costs associated with such projects have increased steadily.

On a smaller scale, water wheels and similar mechanisms have long been utilized to supply power to machinery and/or electrical generators. Small scale hydropower projects present an appealing alternative to large hydropower projects, are relatively inexpensive to fabricate, and reduce environmental impact. However, some of such known water wheel systems involve complicated components, must be physically located above water, may present real hazards to marine life and vessels, and generally require major shoreline infrastructure. As such, a need exists for an improved small-scale hydropower system.

BRIEF DESCRIPTION OF THE DISCLOSURE

In one implementation, a hydropower module for use in a flowing body of water is described. The module includes an axle and a plurality of paddle fans rotatably coupled to the axle and having a paddle fan rotation. Each paddle fan of the plurality of paddle fans includes a plurality of blades configured to be driven by the body of water. The plurality of paddle fans are oriented in an arc wherein the blades of adjacent paddle fans are closer together at a top of the paddle fan rotation than at a bottom of the paddle fan rotation.

In another implementation, a hydroelectric turbine system for use in a flowing body of water is described. The system includes a hydropower module including an axle and a plurality of paddle fans rotatably coupled to the axle and having a paddle fan rotation. Each paddle fan of the plurality of paddle fans includes a plurality of blades configured to be driven by the body of water. The plurality of paddle fans are oriented in an arc wherein the blades of adjacent paddle fans are closer together at a top of the paddle fan rotation than at a bottom of the paddle fan rotation. The system further includes a generator operatively coupled to the hydropower module, the generator configured to convert rotational movement of the plurality of paddle fans into electrical power.

In yet another implementation, a method of manufacturing a hydropower module is described. The method includes forming a housing, coupling an axle to the housing, and rotatably coupling a plurality of paddle fans having a paddle fan rotation to the axle. Each paddle fan of the plurality of paddle fans includes a plurality of blades configured to be driven by a flow of water. The method further includes orienting the plurality of paddle fans in an arc wherein the blades of adjacent paddle fans are closer together at a top of the paddle fan rotation than at a bottom of the paddle fan rotation.

DETAILED DESCRIPTION

The present disclosure is directed to small scale hydroelectric turbine systems for use in bodies of water. In particular, the systems are well-suited for river and stream applications. Moreover, the systems include unique water paddle designs that facilitate increased power generation and safety combined with minimal visual, acoustic, and environmental impacts.

Figure 1:
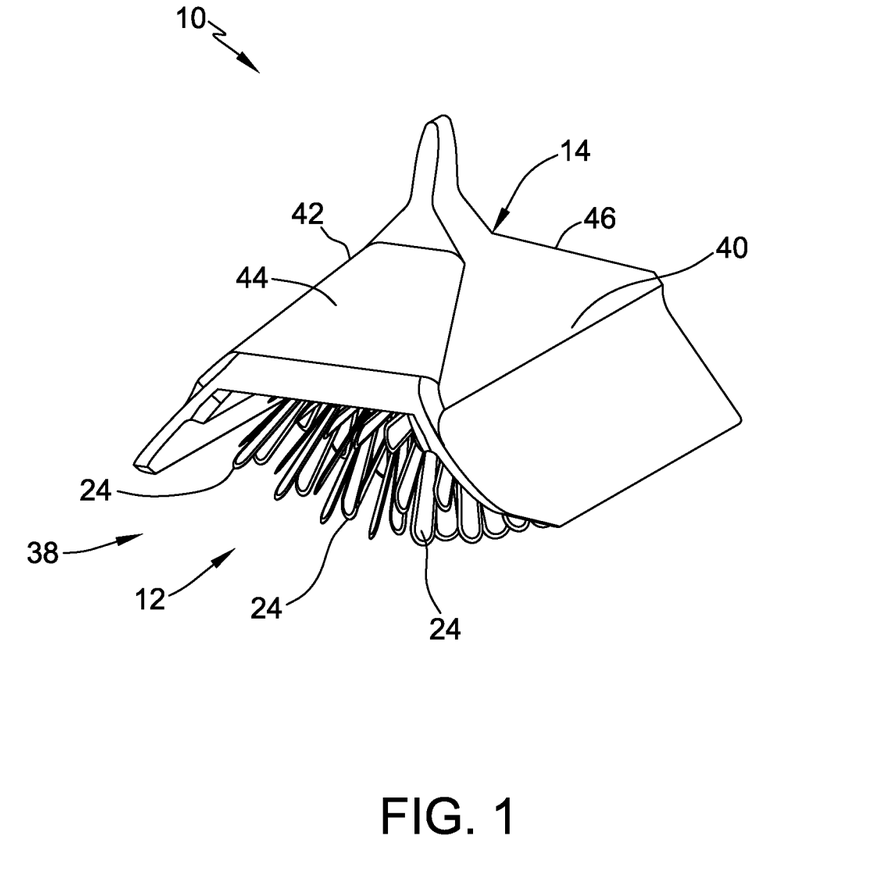
FIG. 1 is a perspective view of an exemplary hydropower module.
Figure 2:
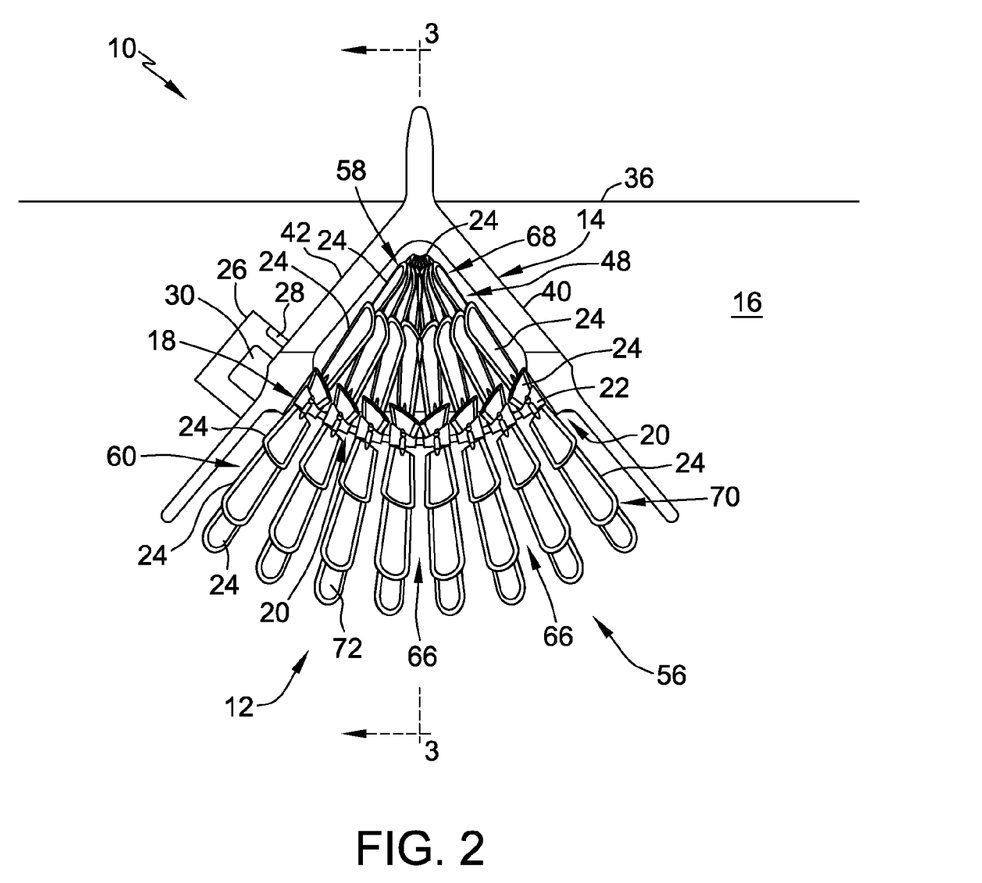
FIG. 2 is a front view of the hydropower module shown in FIG. 1 and with a front hood removed.
Figure 3:
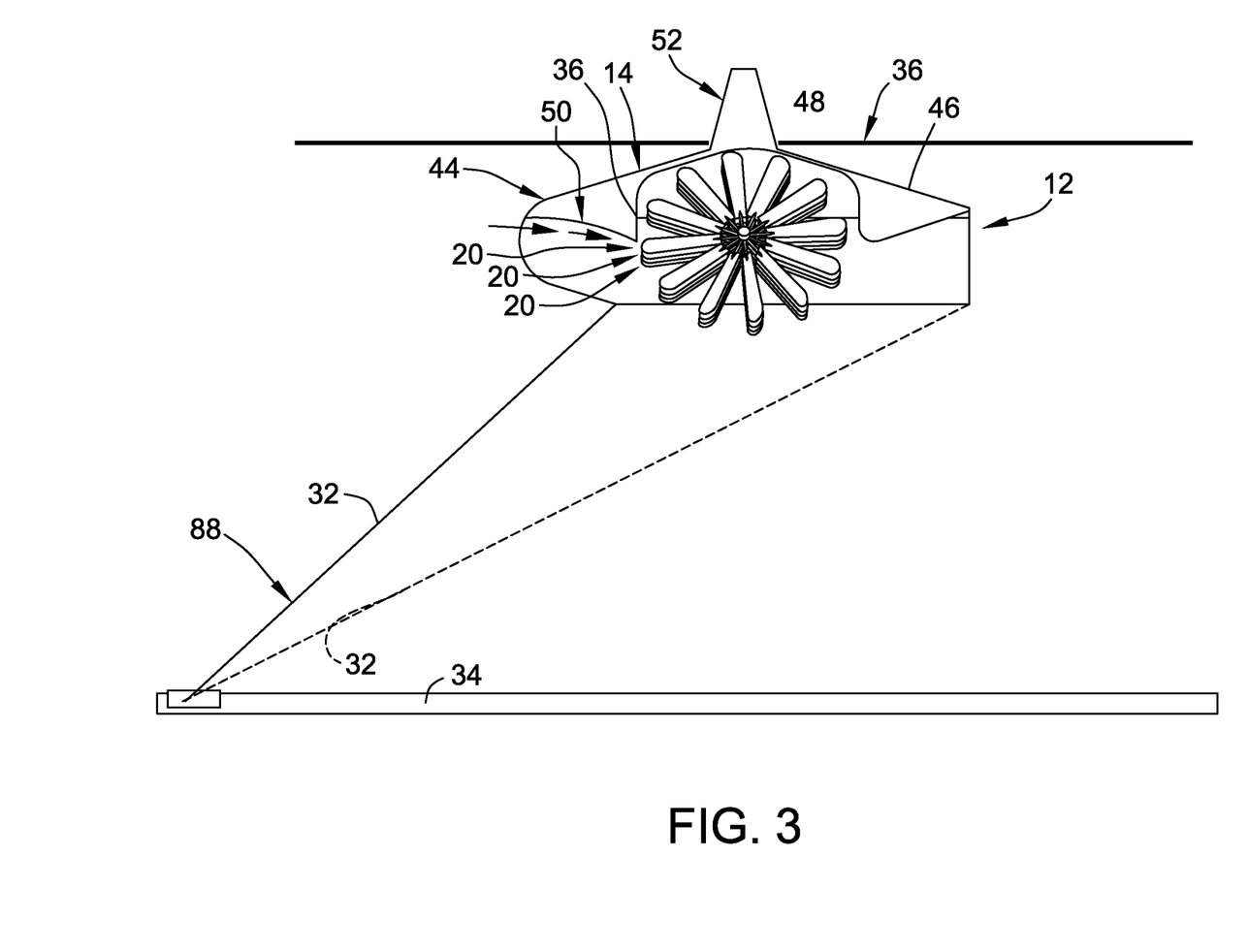
FIG. 3 is a cross-sectional view of the hydropower module shown in FIG. 1 and taken along line 3-3.

FIG. 1 is a perspective view of an exemplary hydropower module 10 for use in a body of water, such as a river or stream. In one aspect, hydropower module 10 is a small-scale hydroelectric turbine (e.g. 100 kW-5 MW) that harvests electrical power from flowing water. FIG. 2 is a front view of hydropower module 10 with a front hood 44 removed and looking downstream, and FIG. 3 is a cross-sectional view of hydropower module 10.

In the exemplary implementation, hydropower module 10 includes a paddle wheel system 12 housed within a housing 14 that is positioned in a flowing body of water 16 for energy extraction. Paddle wheel system 12 includes a plurality of flanged axle segments 17 and a plurality of paddle fans 20 that are rotatably coupled to an axle 18 formed by segments 17. Each paddle fan 20 includes a hub 22 including a plurality of blades 24 extending therefrom. A dry-box 26 is coupled to housing 14 and houses electronics 28 and a generator 30 therein. In the exemplary implementation, generator 30 is coupled to axle 18 to transform rotary movement of paddle fans 20 into electrical energy.

In the exemplary implementation, hydropower module 10 is positioned within flowing water 16. A plurality of anchor cables 32 are coupled to housing 14 and to an object, such as a riverbed 34, to facilitate maintaining the position of hydropower module 10 within the flowing body of water 16. As illustrated in FIG. 3, the relationship between hydropower module 10 and a water level 36 is self-adjusted and maintained during changing water levels. As shown in FIGS. 2 and 3, housing 14 is located completely below water level 36, thus reducing the visual impact of hydropower module 10, as compared to known systems that have a large portion located above the water level. Alternatively, in some implementations, a portion of housing 14 may extend a distance above water level 36 (e.g. for locating purposes).

In the exemplary implementation, housing 14 includes sidewalls 40 and 42, a front hood 44, and a rear hood 46. In the exemplary implementation, sidewalls 40 and 42 extend obliquely between front hood 44 and rear hood 46. Sidewalls 40 and 42, and hoods 44 and 46, define a cavity 48 within housing 14 that provides rotational clearance for blades 24, as well as provides an air pocket that ensures hydropower module 10 remains buoyant near water level 36. This is particularly important in rivers and streams where the highest flow rate is generally located near the water surface.

In the exemplary implementation, sidewalls 40 and 42 facilitate deflecting marine vessels and/or floating debris, and this facilitates reducing damage caused by inadvertent collisions therewith. In the exemplary implementation, when impacted by a vessel or object, hydropower module 10 is designed to be temporarily forced deeper under water to enable vessel/object passage and then return to its normal position, without expelling the air pocket within cavity 48. Additionally, in some implementations, an air pump (not shown) may be provided to maintain a desired amount of air volume within air cavity 48 (e.g. to control system buoyancy). Such a pump may be pressure activated, for example.

In the exemplary implementation, housing 14 is shaped for zero lift and includes an opening 38 defined therein that faces upstream. Opening 38 is sized and shaped to facilitate controlling a direction, a speed and a volume of a flow of water entering therethrough to optimize power generation by paddle fans 20. Additionally, in the exemplary implementation, front hood 44 includes a ramped or arcuate portion 50, as shown in FIG. 3. Because of its hydrodynamic curvature, arcuate portion 50 accelerates and directs flowing water towards paddle wheel system 12, as described in more detail herein. In the exemplary implementation, housing 14 also includes a navigation fin 52 that extends a distance above water level 36. Navigation fin 52 facilitates reducing collisions by providing visual warning to marine vessels of the presence of hydropower module 10. Additionally, navigation fin 52 may be fitted with lights, beacons, or other warning devices. In the exemplary implementation, a debris guard (not shown) may be coupled to housing 14 to prevent large aquatic animals and underwater objects/debris from colliding with housing 14 and/or paddle wheel system 12. For example, the debris guard may be shaped similar to a cow-catcher with multiple, full-length streamwise deflecting rails, and may be ahead of, below and/or behind each paddle fan 20.

In the exemplary implementation, housing 14 houses paddle wheel system 12. Moreover, in the exemplary implementation, axle 18 is coupled to housing sidewalls 40 and 42, and each paddle fan 20 is rotatably coupled to axle 18. With hydropower module 10 positioned within flowing water 16, the water contacts blades 24 to rotate them about axle 18. In the exemplary implementation, axle 18 is arcuate. Alternatively, axle 18 may have any other shape (e.g. straight). However, in the exemplary implementation, axle 18 provides advantages to hydropower module 10 that are best described with reference to FIG. 2. Because of the curvature of axle 18, paddle fans 20 each have a different axis of rotation, which results in an arc formation 56 that includes a pinched section 58 (located in a blade return segment 76 of a blade path or paddle fan rotation 74 shown in FIG. 4) and a spaced section 60 (located in a power generation segment 80 of paddle fan rotation 74).

In the exemplary implementation, arc formation 56 "pinches" blades 24 together near a top 62 of paddle fan rotation 74, and spreads blades 24 apart near a bottom 64 of the paddle fan rotation 74, such that adjacent blades 24 are closer together in pinched section 58 than in spaced section 60. The orientation of blades 24 within pinched section 58 facilitates the use of less housing space, thus reducing construction material necessary for housing 14 and allows angling of sidewalls 40 and 42. Additionally, air within cavity 48 facilitates reducing resistance on rotating blades 24 within pinched section 58, thus increasing efficiency and power generation. In spaced section 60, gaps or spaces 66 are defined between adjacent blades 24. Blades 24 spaced apart by gaps 66 are as effective in fluid force extraction as known, solid and/or continuous paddle boards. Additionally, gaps 66 enable small animal and debris passage therethrough, thus reducing hazards to wildlife, damage to hydropower module 10, while reducing the environmental impact.

In the exemplary implementation, paddle wheel system blades 24 are capable of feathering, i.e. a mechanical re-orienting where each blade 24 is positioned with its narrowest, least drag-producing profile facing towards an oncoming stream of fluid. As such, blades 24 are rotatable between a feathered orientation 68 wherein blades 24 are rotated parallel to the fluid flow direction (e.g. flow of a river), and an unfeathered or power-extraction orientation 70 wherein each blade face 72 is positioned generally orthogonally to the fluid flow direction to facilitate maximizing net drag on blades 24.

Figure 4:
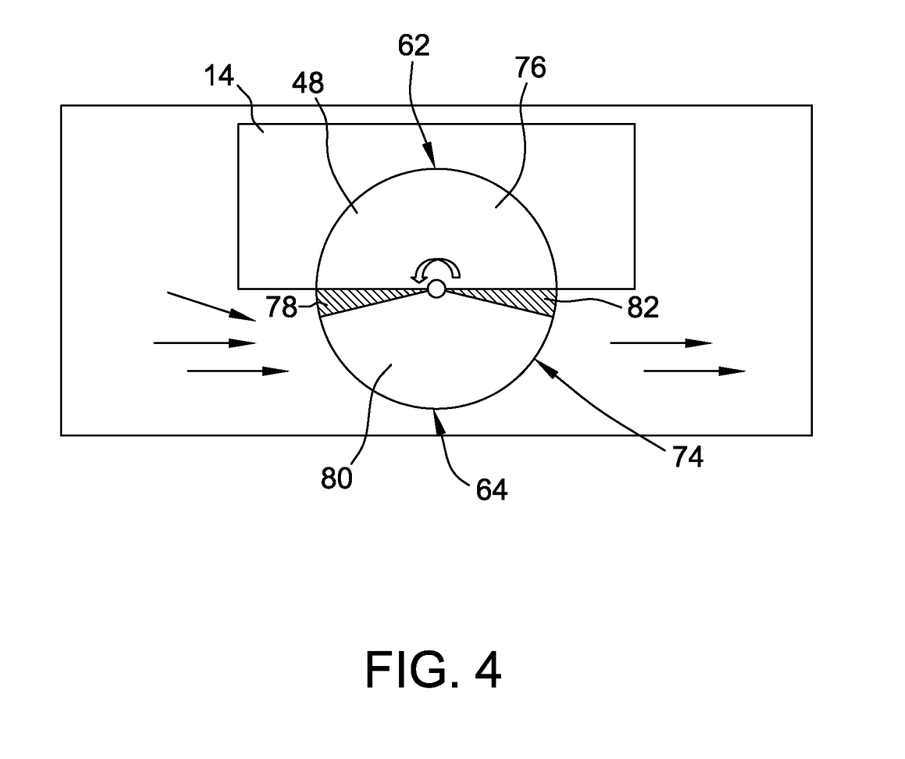
FIG. 4 is a diagram of the hydropower module shown in FIG. 3.

As shown in a simplified diagram in FIG. 4, in the exemplary implementation, blades 24 rotate through blade path 74 that includes return segment 76, an unfeather segment 78, power extraction segment 80, and a feather segment 82. In return segment 76, blades 24 are feathered and pinched as they travel through cavity 48. Blades 24 enter the water in unfeather segment 78 in a feathered orientation (e.g. blade edge first) that reduces resistance on blades 24 and that causes low-acoustic water entry. Blades 24 then quickly rotate within unfeather segment 78 into the power extraction orientation 70. Within power extraction segment 80, each blade 24 is propelled by flowing water and water accelerated by arcuate portion 50. Blades 24 remain spaced and unfeathered through power extraction segment 80 until they reach feather segment 82, wherein blades 24 are rotated back into a feathered orientation 68 to again reduce resistance and noise before emerging from the water. Blades 24 then enter return segment 76 and the cycle is repeated. As such, blades 24 feather at the water entry and the exit point to facilitate minimizing above-water and below-water acoustic signatures and to minimize detracting torques.

Figure 5:
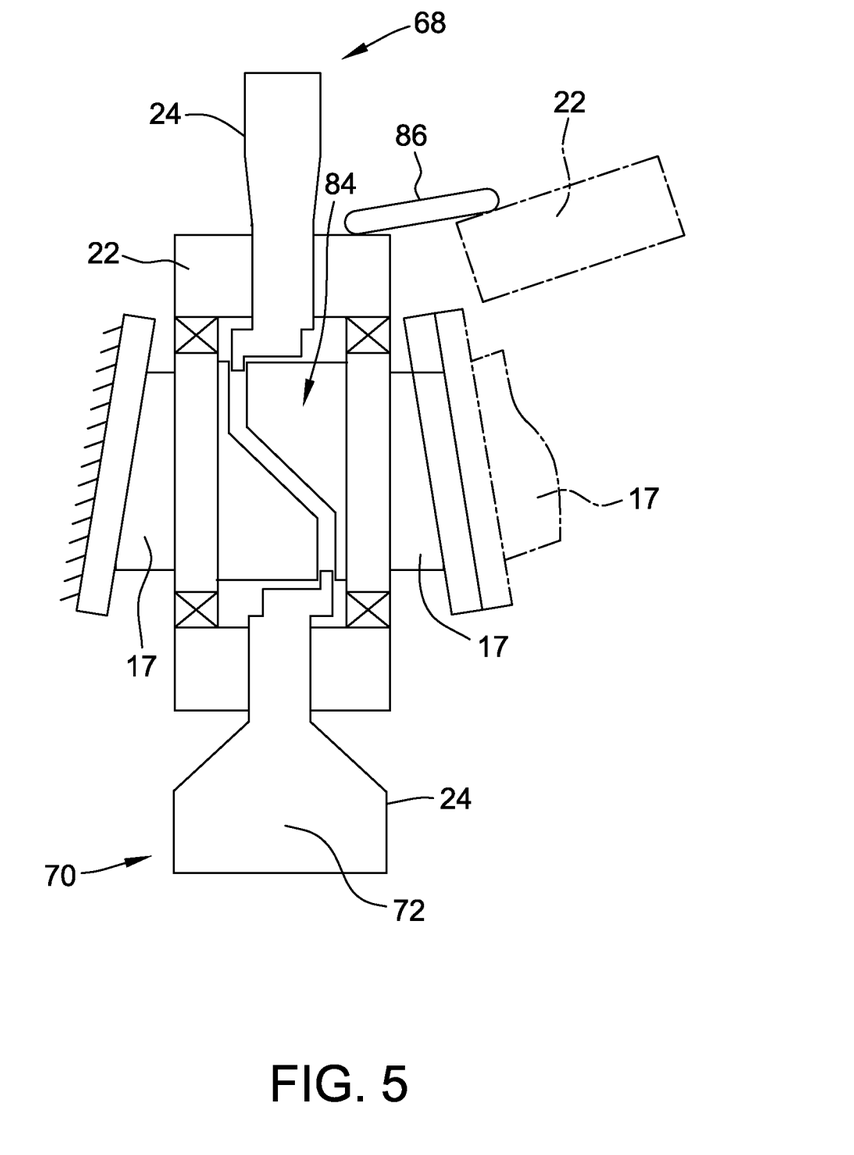
FIG. 5 is a cross-sectional view of a portion of the hydropower module shown in FIG. 2.

FIG. 5 illustrates a cross-sectional view of flanged axle segments 17 and paddle fan 20. In the exemplary implementation, flanged axle segments 17 are coupled to each other with bolts (not shown) to form axle 18. Alternatively, axle segments 17 are coupled by any means that enables module 10 to function as described herein. In the exemplary implementation, blades 24 are rotatably coupled to hub 22, and cam slots/rollers 84 of hub 22 operate to feather and unfeather blades 24. However, hub 22 and/or paddle wheel system 12 may have any construction that enables paddle wheel system 12 to function as described herein. In the exemplary implementation, each hub 22 is rotationally coupled with adjacent hubs 22 by a torque transfer link 86, such that paddle fans 20 of paddle wheel system 12 are rotationally joined. The flow of water within body of water 16 rotates paddle fans 20, and the combined torque of paddle fans 20 is transmitted to generator 30. In the exemplary implementation, a power cable 88 is electrically coupled to generator 30 to deliver electrical power produced by generator 30 to another location such as an on-shore power station (not shown).

Figure 6:
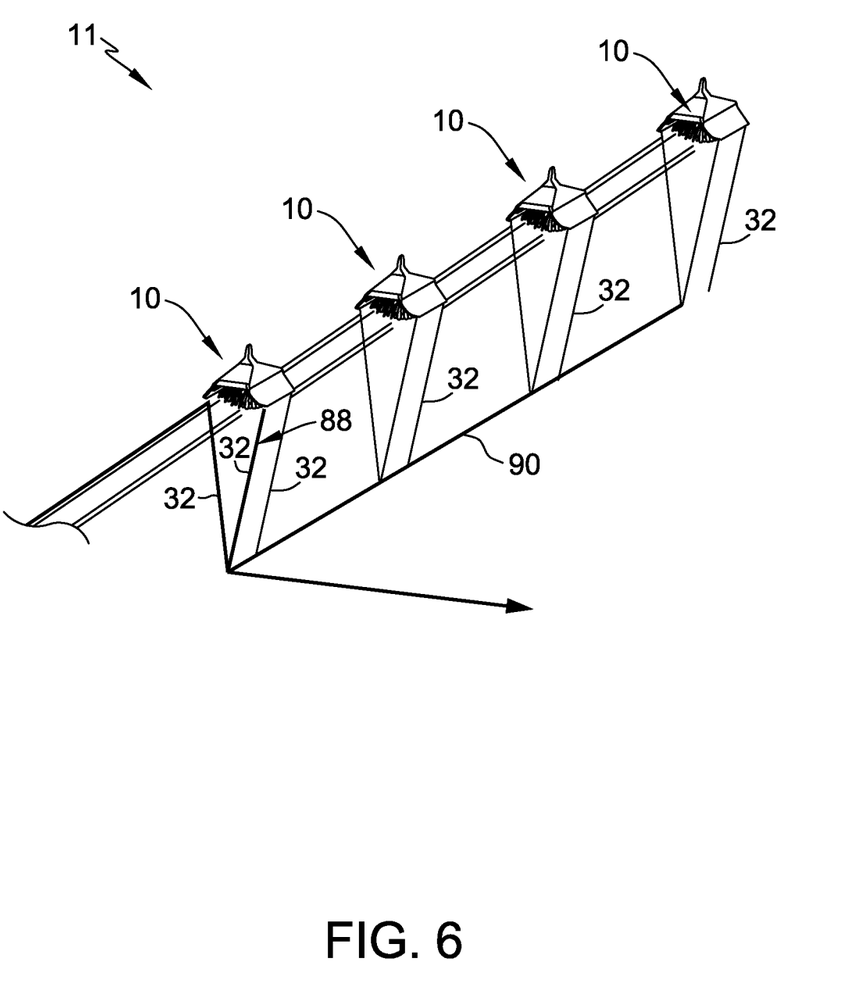
FIG. 6 is a perspective view of an exemplary hydropower system.

FIG. 6 illustrates an exemplary hydropower turbine system 11, which includes one or more hydropower modules 10. In the exemplary implementation, anchor cables 32 position four hydropower modules 10 in-line within flowing body of water 16. However, any number and orientation of modules 10 is within the scope of this disclosure. In the exemplary implementation, hydropower modules 10 are each electrically coupled to a power cable 88 to electrically couple each generator 30 to a streambed power cable 90 that is electrically coupled to an onshore facility to deliver the total power generated by hydropower turbine system 11. Alternatively, each power cable 88 may run directly to the onshore facility.

A method of fabricating a hydropower module 10 is described herein. The method includes forming a housing 14. In the exemplary implementation, housing 14 is fabricated from reinforced concrete and is cast on-site. However, housing 14 may be formed from any suitable material that enables hydropower module 10 to function as described herein. Additionally, housing 14 may be fabricated off-site. In the exemplary implementation, housing 14 is formed with a pair of sidewalls 40 and 42, a front hood 44, a rear hood 46, and a cavity 48. Front hood 44 is also formed with curved portion 50 to facilitate accelerating and directing flowing water toward a number of paddle fans 20. Housing 14 is optionally formed with navigation fin 52. The method further includes coupling a debris guard rail (not shown) and an air pump (not shown) to housing 14. The method further includes coupling an axle 18 to housing 14, and rotatably coupling a plurality of paddle fans 20 to axle 18. Each of paddle fans 20 includes a hub 22 and a plurality of blades 24 extending therefrom, which blades 24 are configured to rotate between a feathered orientation 68 and a power extraction orientation 70.

In the exemplary implementation, the method also includes orienting paddle fans 20 on axle 18 into an arc formation 56 such that each paddle fan 20 has a different axis of rotation, and together paddle fans 20 form a pinched section 58 at a top 62 of the paddle rotation 74 and a spaced section 60 at a bottom 64 of the paddle rotation 74. The method further includes coupling a dry-box 26, electronics 28 and a generator 30 to housing 14 and/or axle 18, and coupling at least one anchor cable 32 to housing 14 for securing hydropower module 10 within a flowing body of water 16.

As described herein, the hydropower modules provide small-scale, hydroelectric turbine systems for use in bodies of water. In particular, the systems are well-suited for river and stream applications. The systems include a housing that has a low-profile, minimal visual impact, that increases safety through collision mitigation, and that causes minimal environmental impact. The systems also include a unique paddle wheel system, which reduces space requirements, generates low acoustics production, and reduces hazards to wildlife and the environment. As such, the hydropower modules are a practical energy harvesting system that is safe, aesthetically pleasing, and that has low environmental impact and minimal shoreline infrastructure requirements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A hydropower module for use in a body of water, said module comprising:
    an axle; and
    a plurality of paddle fans rotatably coupled to said axle and having a paddle fan rotation, each paddle fan of said plurality of paddle fans comprising a plurality of blades configured to be driven by the body of water, wherein said plurality of paddle fans are oriented in an arc wherein said blades of adjacent paddle fans are closer together at a top of the paddle fan rotation than at a bottom of the paddle fan rotation.

2. The module of claim 1, wherein said plurality of paddle fans is substantially located beneath a surface of the body of water.

3. The module of claim 1, wherein said axle comprises a plurality of axle segments.

4. The module of claim 3, wherein each paddle fan further comprises a hub, said plurality of blades coupled to said hub and said hub rotatably coupled to one axle segment of said plurality of axle segments.

5. The module of claim 4, further comprising a torque transfer link coupled between adjacent hubs of adjacent paddle fans.

6. The module of claim 4, wherein each hub comprises a cam slot configured to rotate said plurality of blades between a feathered orientation and an unfeathered orientation.

7. The module of claim 1, further comprising a housing coupled to said axle, said housing comprising a cavity defined therein that is configured to be located at least partially below a surface of the body of water during operation of said module.

8. The module of claim 7, wherein the top of the paddle fan rotation is located within said cavity.

9. The module of claim 7, wherein said housing comprises a front hood comprising a ramped portion configured direct a flow of water toward said plurality of blades.

10. A hydroelectric turbine system for use in a body of water, said system comprising:
    a hydropower module comprising an axle and a plurality of paddle fans rotatably coupled to said axle and having a paddle fan rotation, each paddle fan of said plurality of paddle fans comprising a plurality of blades configured to be driven by the body of water, wherein said plurality of paddle fans are oriented in an arc wherein said blades of adjacent paddle fans are closer together at a top of the paddle fan rotation than at a bottom of the paddle fan rotation; and
    a generator operatively coupled to said hydropower module, said generator configured to convert rotational movement of said plurality of paddle fans into electrical power.

11. The system of claim 10, wherein said plurality of blades rotate between a feathered orientation and an unfeathered orientation.

12. The system of claim 10, further comprising a housing coupled to said axle, wherein said housing comprises a cavity defined therein that is configured to be located at least partially below a surface of the body of water during operation of said module.

13. The system of claim 12, wherein the top of the paddle fan rotation is located within said cavity.

14. The system of claim 12, wherein said housing comprises a front hood comprising a ramped portion configured to direct a flow of water toward said plurality of blades.

15. The system of claim 10 wherein said axle comprises a plurality of axle segments, and wherein each paddle fan further comprises a hub, said plurality of blades coupled to said hub and said hub rotatably coupled to one axle segment of said plurality of axle segments.

16. The module of claim 15, further comprising a torque transfer link coupled between adjacent hubs of adjacent paddle fans.

17. A method of manufacturing a hydropower module, the method comprising:
    forming a housing;
    coupling an axle to the housing;
    rotatably coupling a plurality of paddle fans having a paddle fan rotation to the axle, each paddle fan of the plurality of paddle fans comprising a plurality of blades configured to be driven by a flow of water; and orienting the plurality of paddle fans in an arc wherein the blades of adjacent paddle fans are closer together at a top of the paddle fan rotation than at a bottom of the paddle fan rotation.

18. The method of claim 17, wherein said forming a housing further comprises forming a pair of sides configured to deflect marine vessels and/or floating objects away from the hydropower module, and forming a cavity in the housing that is configured to receive the plurality of blades at the top of the paddle fan rotation.

19. The method of claim 17, further comprising coupling a generator to the plurality of paddle fans, the generator configured to convert rotational movement of the plurality of paddle fans into electrical power.

20. The method of claim 17, further comprising rotatably coupling a hub of each paddle fan to the axle, coupling a torque transfer link to adjacent hubs of adjacent paddle fans, and rotatably coupling the plurality of blades of each paddle fan to the hub of the paddle fan, wherein the plurality of blades are rotatable between a feathered orientation and an unfeathered orientation.

\* \* \* \* \*